(12) United States Patent
Patterson et al.

(10) Patent No.: US 6,918,599 B2
(45) Date of Patent: Jul. 19, 2005

(54) ANTI-DEFLECTION TOOLING

(76) Inventors: Alan C. Patterson, 2424 E. Coop Lake Rd., Howell, MI (US) 48843; Mark F. Ouillette, 4020 Cedar Lake Rd., Howell, MI (US) 48843

(*) Notice: Subject to any disclaimer, the term of this patent is extended or adjusted under 35 U.S.C. 154(b) by 189 days.

(21) Appl. No.: 10/373,223

(22) Filed: Feb. 24, 2003

(65) Prior Publication Data

US 2003/0160402 A1 Aug. 28, 2003

Related U.S. Application Data

(60) Provisional application No. 60/358,783, filed on Feb. 22, 2002.

(51) Int. Cl.[7] .......................................... B23B 31/175
(52) U.S. Cl. ..................... 279/106; 279/119; 157/16
(58) Field of Search .......................... 157/14, 16, 18; 279/37, 38, 106, 107, 108, 109, 118, 119

(56) References Cited

U.S. PATENT DOCUMENTS

| | | | | |
|---|---|---|---|---|
| 1,321,739 A | * | 11/1919 | Haltman | 279/118 |
| 1,713,978 A | * | 5/1929 | Olson | 279/119 |
| 1,846,898 A | * | 2/1932 | Packer | 279/2.14 |
| 2,018,088 A | * | 10/1935 | Poock et al. | 279/136 |
| 2,448,881 A | * | 9/1948 | Glynn | 279/106 |
| 5,562,007 A | * | 10/1996 | Seymour | 82/1.11 |
| 5,791,661 A | | 8/1998 | Reyes | |
| 5,820,137 A | * | 10/1998 | Patterson | 279/141 |
| 5,848,795 A | * | 12/1998 | Masatsugu et al. | 279/137 |
| 5,895,059 A | * | 4/1999 | Patterson | 279/106 |
| 6,126,174 A | * | 10/2000 | Reece et al. | 279/2.24 |
| 6,394,691 B1 | * | 5/2002 | Stephan | 403/344 |

* cited by examiner

Primary Examiner—Derris H. Banks
Assistant Examiner—Michael W. Talbot
(74) Attorney, Agent, or Firm—Brooks Kushman P.C.

(57) ABSTRACT

Anti-deflection tooling is provided for a pull back chuck. Equally spaced gussets are disposed between the riser body and the face plate of the chuck, to minimize or eliminate deflection of the face plate when a workpiece is clamped into the chuck. Adjustment devices are also provided so that existing chucks can be retrofitted with the anti-deflection tooling and an operator can true up the face plate prior to running a part.

22 Claims, 2 Drawing Sheets

ANTI-DEFLECTION TOOLING

CROSS-REFERENCE TO RELATED APPLICATIONS

This application claims the benefit of U.S. provisional application Ser. No. 60/358,783, filed Feb. 22, 2002.

BACKGROUND OF THE INVENTION

1. Field of the Invention

The present invention relates to anti-deflection tooling that reduces the deflection of a chuck when a workpiece is clamped in it.

2. Background Art

In the past few decades, the use of aluminum wheels on vehicles has become increasingly popular. This has led manufacturers to try to find more efficient, cost-effective methods of producing the wheels. The most common method of production involves casting an aluminum wheel into a near net shape and then machining the wheel until it meets the finished part specifications. The machining of aluminum wheels typically involves placing the wheel in a chuck, applying a clamping force with the chuck, and spinning the wheel at a relatively high speed while cutting tools are applied to the aluminum.

Before the mid-1980s, the chucks used to hold aluminum wheels typically applied the clamping force in a radial direction. Because a relatively high clamping force is required to hold a vehicle wheel, there is a tendency for an aluminum wheel to undergo a slight deformation when it is clamped in this type of chuck. A deformation of this kind reduces the accuracy with which the wheel can be machined. Specifically, this type of deformation may cause the wheel to have an undesirably large radial runout. In addition, the radial clamping chucks used to hold the wheels were quite large, which limited the speed at which the wheel could be spun. Because it is generally more efficient to machine aluminum alloys at high speeds, some efficiency was lost in the machining process because of the sheer bulk of the chucks used to clamp the wheels.

In the mid-1980s, an alternative to the large, radially clamping chucks was introduced. Generically known as a "pullback" chuck, the use of these chucks allowed for faster turning speeds and less distortion of the wheel resulting from clamping forces. A pullback chuck typically uses three equally spaced cam arms to apply the clamping force to a workpiece. The force is applied through the cam arms such that an initial radial force is redirected into a force that is parallel to the axis of rotation.

Pullback chucks often include a large diameter flat disk, or face plate, which is bolted to a smaller diameter shell, also known as a riser body. Corresponding to the three cam arms, the riser body has attached to it three yoked arms into which one end of each cam arm is pinned. A second pin, mounted within the face plate, provides a pivot point for the cam arms as the clamping force is applied. Mounted onto the face plate in the area outboard of the riser body are three equally spaced rest blocks. These blocks, or part rests, keep the wheel properly oriented during the machining operation.

The use of the pullback chuck allows aluminum wheels to be machined at higher speeds with less radial runout, thereby creating a superior finished product. Despite these advantages, the pullback chuck did introduce a minor distortion in the wheel in an axial direction, which often resulted in an undesirable lateral runout. As clamping forces sufficient to hold the wheel are applied, the face plate on a pullback chuck will often deflect slightly in the direction of the force. This deflection, which occurs around the perimeter of the face plate, may be in the neighborhood of 0.002–0.010 inches, and occurs almost uniformly at all three part rests. Aware of this unwanted deflection, manufacturers tended to rely on the offset capabilities of CNC lathe controllers to produce parts that met specifications. Recently, the demand for lighter, better riding vehicles has imposed upon wheel manufacturers increasingly tight tolerances. Today, controlling the deflection of the face plate in a pullback chuck can mean the difference between producing high quality finished parts that meet a customer's stringent specifications, or producing scrap.

Accordingly, it is desirable to provide anti-deflection tooling that is easily attached to an existing pullback chuck, and incorporated into the designs of new chucks, so that deflection of the workpiece is reduced or eliminated, thereby resulting in higher quality finished parts and a reduced scrap rate.

SUMMARY OF THE INVENTION

One aspect of the present invention provides anti-deflection tooling that is easily attached to an existing pullback chuck so that deflection of the workpiece resulting from clamping forces is reduced or eliminated.

Another aspect of the invention provides anti-deflection tooling that can be incorporated into new chuck designs so that the use of these chucks will not cause undesirable deflection of the workpiece during the machining process.

A further aspect of the invention provides anti-deflection tooling that when used on a pullback chuck facilitates the manufacture of higher quality finished parts.

Another aspect of the invention provides anti-deflection tooling for a pullback chuck that helps to reduce the scrap rate by reducing the lateral runout on finished parts.

Accordingly, an apparatus for reducing the deflection of a chuck is provided that comprises a tool body having a first face substantially orthogonal to a second face. A projection extends from the first face and is configured to be received by the chuck. The apparatus also includes at least one attachment feature for facilitating attachment of the apparatus to the chuck.

Another aspect of the invention provides a chuck having an anti-deflection apparatus for reducing deflection of the chuck, where the anti-deflection apparatus comprises a tool body having a first face substantially orthogonal to a second face. At least one attachment feature is included on the anti-deflection apparatus for facilitating attachment of the apparatus to the chuck.

A further aspect of the invention provides a chuck which comprises a riser body, a face plate attached to the riser body, and an anti-deflection apparatus. The anti-deflection apparatus is disposed between the riser body and the face plate for reducing deflection of the face plate when a workpiece is clamped in the chuck.

Another aspect of the invention provides a chuck body for a wheel to be worked that comprises a shell portion and a plate portion. Attached to the plate portion are cantilevered rest portions that extend radially outboard at spaced points around the shell portion for receiving the wheel to be worked. A cam arm at each of the spaced points is movable with respect to the shell portion. The cam arms clamp the wheel to each of the cantilevered rest portions at their respective spaced points. Affixed to the shell portion is a tool body. The tool body adjustably extends radially outboard alongside a respective cam arm at each of the spaced points to resist distortion of the plate portion when the wheel is clamped to the rest portions.

The above object and other objects, features, and advantages of the present invention are readily apparent from the following detailed description of the best modes for carrying out the invention when taken in connection with the accompanying drawings.

DETAILED DESCRIPTION OF THE PREFERRED EMBODIMENTS

Figure 1:
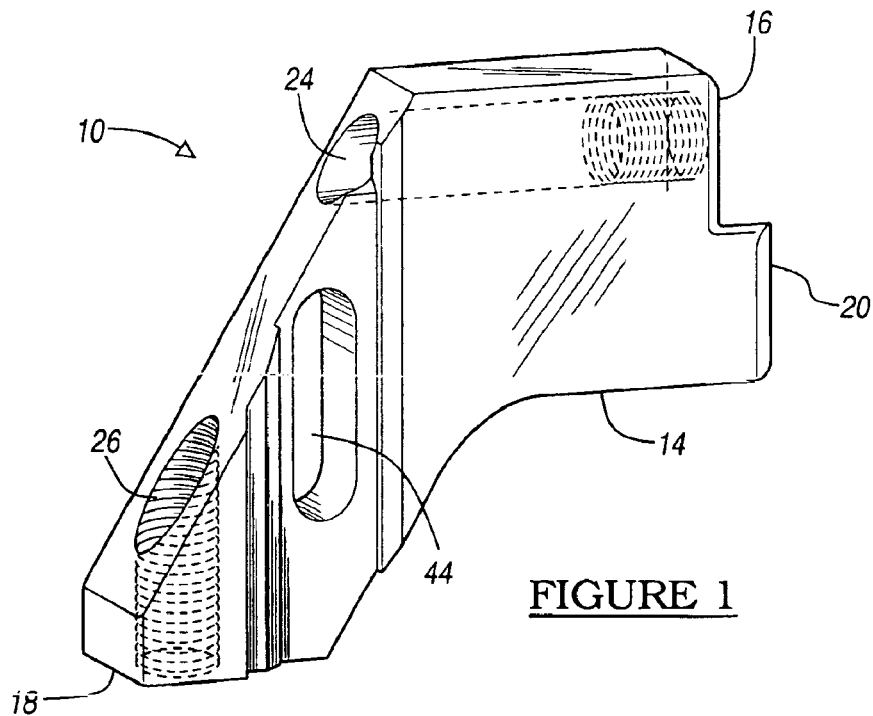
FIG. 1 is a perspective view of an anti-deflection tool configured to be attached to a pullback chuck in accordance with the present invention.

FIG. 1 shows an anti-deflection apparatus 10 in accordance with the present invention. The anti-deflection apparatus 10, also called a gusset, supports and reduces the deflection of a pullback chuck such as the pullback chuck 12 shown in FIG. 2. The gusset 10 includes a tool body 14 that has a first face 16 that is substantially orthogonal to a second face 18, see FIG. 1. Extending from the first face 16 is a projection 20, which is configured to fit in an aperture 21 (see FIG. 3) in a riser body 22 of the pullback chuck 12 shown in FIG. 2. The pullback chuck 12 is configured with six gussets 10, two of which are not visible. The projection 20 provides rotational stability for the gussets 10 during high speed rotation of a workpiece (not shown). The workpiece may be a vehicle wheel, and in particular an aluminum wheel, since pullback chucks are well suited to this application; however, the pullback chuck 12, configured with gussets 10, is well suited to many tight tolerance applications where very little workpiece deflection is allowed.

Figure 2:
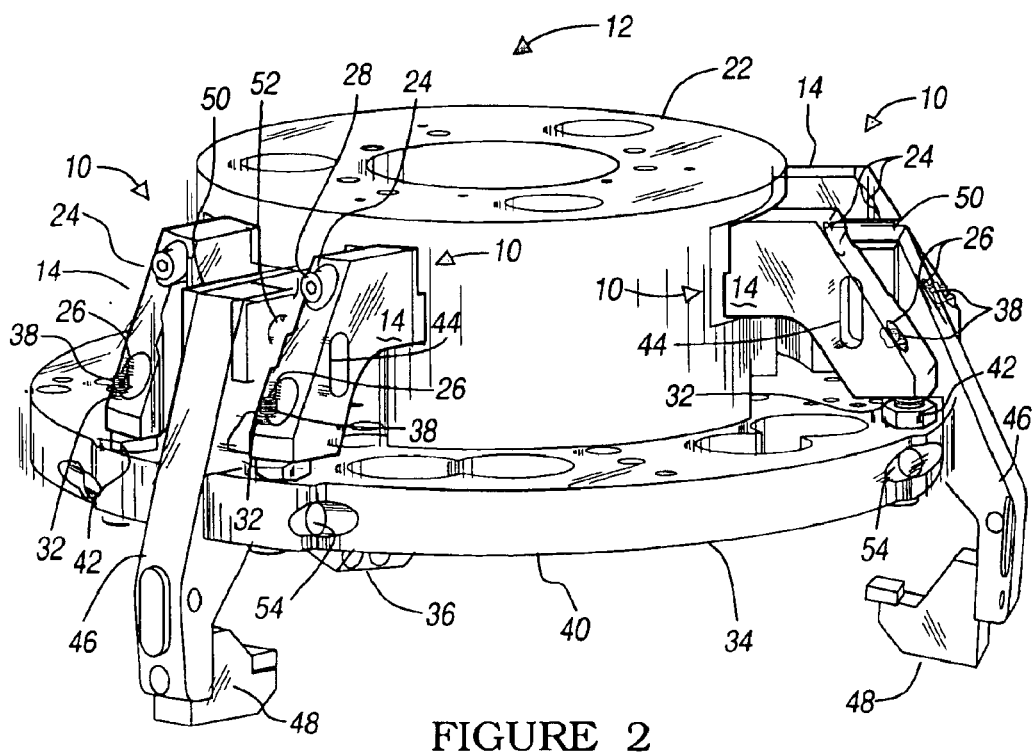
FIG. 2 is a perspective view of a pullback chuck with anti-deflection tooling, including adjustment devices, attached between the riser body and the face plate of the chuck.
Figure 3:
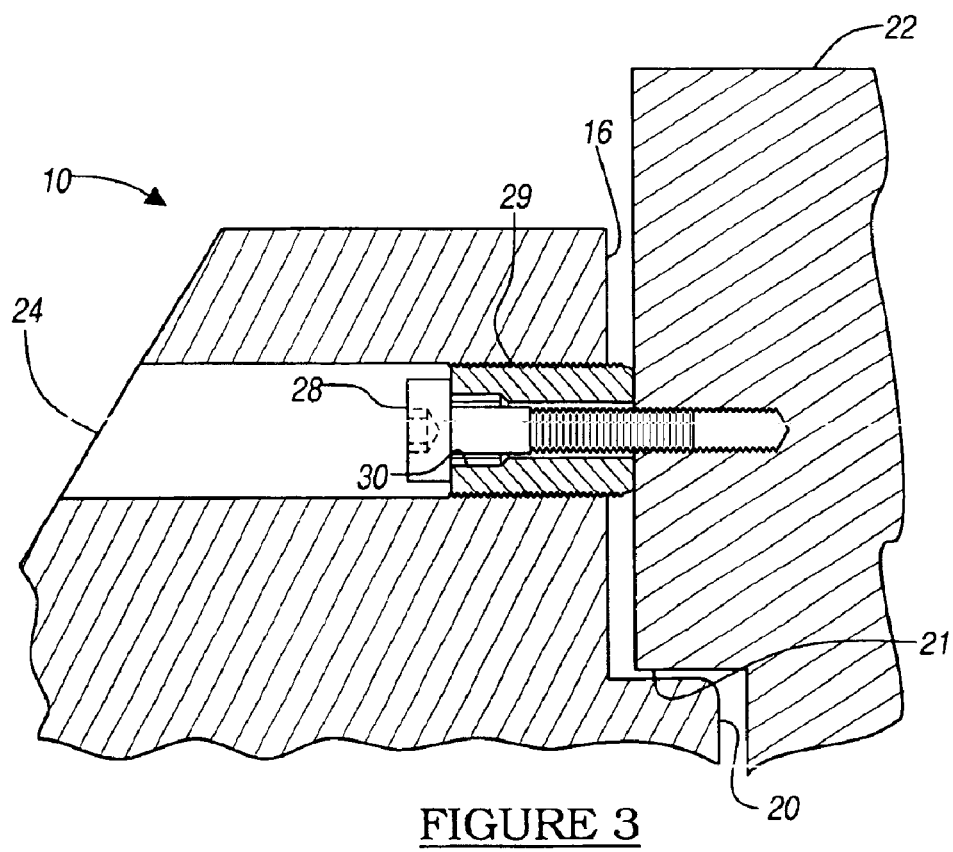
FIG. 3 is a partial sectional view of a portion of the anti-deflection tooling attached to the riser body on the pullback chuck.

Examining FIGS. 1 and 2, it is seen that each gusset 10 includes two attachment features, which in this embodiment, comprise a counterbored hole 24 and a threaded hole 26. The hole 24 is configured to allow a threaded fastener 28 to extend through the first face 16 and thread directly into the riser body 22. Although this method effectively secures the gusset 10 to the riser body 22, it does not allow for adjustment of the gusset 10 relative to the riser body 22, which may be important when retrofitting existing chucks. To address this, the hole 24 is at least partially threaded near the first face 16, see FIG. 3. With the hole 24 thus configured, a set screw 29 can be threaded into it. Tightening the set screw 29 after it abuts the riser body 22 causes the gusset 10 to move away from the riser body 22; thereafter, loosening the set screw 29 causes the gusset 10 to move toward the riser body 22. Thus, the set screw 29 comprises a first adjustment device that allows the gusset 10 to be adjusted relative to the riser body 22. The set screw 29 includes a through hole 30 configured to receive a fastener, such as the threaded fastener 28. After the location of the gusset is properly adjusted, the threaded fastener 28 is inserted through the hole 30 in the set screw 29 and is threaded into the riser body 22, effectively keeping the set screw 29 locked in position.

Figure 4:
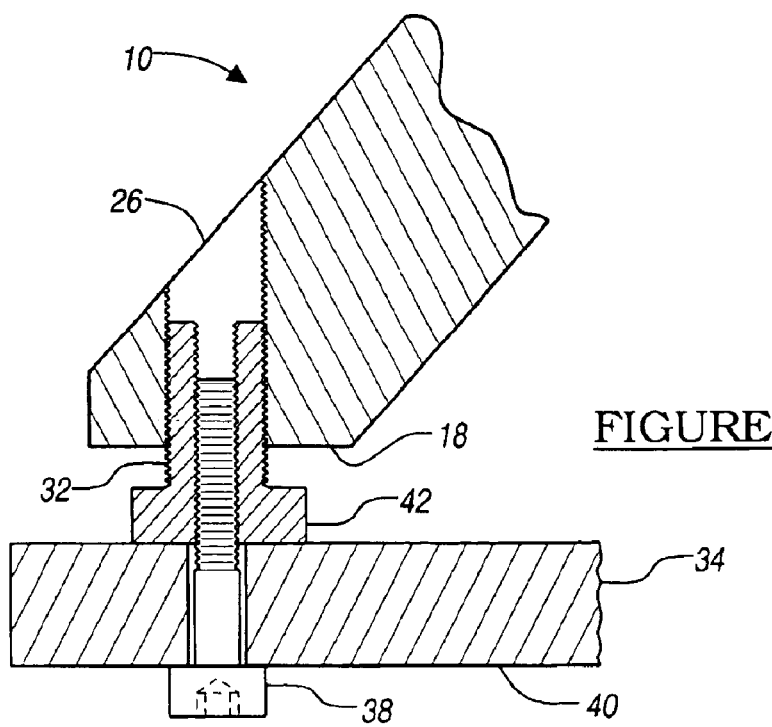
FIG. 4 is a partial sectional view of a portion of the anti-deflection tooling attached to the faceplate on the pullback chuck.

The threaded hole 26 works together with a second adjustment device, which in this embodiment is a hex head bolt 32 with a threaded hole through its axis, see FIG. 4. Each of the six gussets 10 has its own hex head bolt 32, which serves a number of important functions. First, as in the case of the set screws 29, the bolts 32 allow the gussets 10 to be retrofitted onto existing chucks. In addition, the bolts 32 also allow an operator to make adjustments to the chuck 12 when it is on a machine. In this way, the operator can ensure that the face plate 34 is perpendicular to the axis of rotation. Since the workpiece sits on part rests 36 that are attached to the face plate 34, adjusting the face plate 34 can affect the orientation of the workpiece.

The three part rests 36, only one of which is visible in FIG. 2, are mounted to the face plate 34 in the area outboard of the riser body 22. The part rests 36 may be cantilevered, and are typically located at three equally spaced points around the face plate 34. The bolts 32 have male threads on their outside diameters which mate with female threads inside the threaded holes 26. The bolts 32 also have female threads on their inside diameters to accommodate threaded fasteners 38 that are threaded in from a top 40 of the face plate 34, see FIG. 4. Each of the bolts 32 has a hex head 42 that allows them to be tightened into, or backed out of, a corresponding threaded hole 26. This adjusts the position of the gusset 10 relative to the face plate 34. Using a gauge, such as a dial indicator, the operator can true the face plate 34 by tightening or loosening the bolts 32 as needed. Once the operator has properly adjusted the location of the gussets 10 relative to the face plate 34, the threaded fasteners 38 are tightened down to ensure that the face plate 34 is locked into position.

As previously noted, use of the first and second adjustment devices, in this embodiment, the set screw 29 and the hex head bolts 32, allows an existing chuck—i.e., a chuck that was not originally configured with gussets—to be retrofitted, thereby saving the machining facility the cost of a new chuck. The machining facility can retrofit existing chucks themselves, or a chuck manufacturer can engage in a riser body swap-out program with the machining facility. Often, the chuck manufacturer will be better equipped than the machining facility to modify the riser bodies to accept the gussets. For example, a three-jawed chuck such as 12 shown in FIG. 2, has three pairs of equally spaced gussets 10 that will need to be attached to the riser body 22. This entails proper machining of an aperture to accept the projection 20 extending from the first face 16 of each gusset 10, see FIG. 1. Six threaded holes are also machined into the riser body 22 to accept the threaded fasteners 28.

Although some machining facilities may be equipped to retrofit a chuck, having the chuck manufacturer provide to the machining facility a riser body with the gussets already mounted to it has the added benefit of facilitating faster changeover and reducing down time. Upon receiving a riser body with the gussets attached, a machining facility need only remove the face plate from the existing riser body, attach the new riser body, and use the adjustment devices to ensure that the face plate is perpendicular to the center line of rotation. It may be necessary for the machining facility to drill through six existing holes in the face plate to accommodate the threaded fasteners used in the adjustment devices. This, however, is a simple operation that requires no special equipment, and may not even require particular precision, since the holes may already exist in the face plate. When the chuck is placed on a machine, an operator can then use a dial indicator or other measurement device to ensure that the face plate is perpendicular to the axis of rotation. To complete the swap-out, the machining facility would send the old riser body back to the chuck manufacturer to be retrofitted with gussets and made ready for another swap-out. By using two adjustment devices, such as the set screw 29 and the hex head bolts 32, the gussets 10 are adjustable along two axes, which makes them versatile enough to be used on a wide variety of chucks.

Another benefit of the gussets 10 is a serviceability feature, in this embodiment a through slot 44, that allows for fast tooling changeovers at the machining facility. The slot 44, shown in FIGS. 1 and 2, allows access to other components of the chuck 12. The chuck 12 has three cam arms 46, only two of which are visible in FIG. 2, and each cam arm 46 has an adjustable jaw 48. The adjustable jaws 48 allow the chuck 12 to be used with different sized workpieces; however, the jaws have a limited range of adjustment. Therefore, when a workpiece is too large or too small to fit into the chuck 12, the cam arms 46 are replaced with ones that will accommodate the workpiece. This changeover results in downtime at the machining facility, so it is important that it be performed as quickly as possible. The slot 44 reduces the cam arm changeover time by allowing the cam arms 46 to be replaced when only one of the two corresponding gussets 10 is removed.

Each cam arm 46 is held in a yoke 50, two of which are visible in FIG. 2. A pin 52 holds each cam arm 46 in each yoke 50. The gussets 10 on either side of the corresponding yoke 50 hold the pins 52 in place during machining. When it is necessary to change the cam arms 46, the operator merely removes one of the two corresponding gussets 10, accesses the pin 52 through the slot 44, and, drives the pin 52—e.g., with a pin-punch or screwdriver—toward the side where the gusset 10 was removed. A second pin 54, holding the cam arm 46 to the face plate 34, is then removed and the cam arm 46 replaced. Without the slot 44, both gussets 10 would need to be removed to replace each cam arm. This reduces from six to three the number of gussets 10 that need to be removed and reattached in order to replace the cam arms 46. Hence, the slot 44 reduces downtime and increases the serviceability of the chuck 12, resulting in cost savings for the machining facility.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A chuck, comprising:
   a riser body;
   a face plate attached to the riser body; and
   an anti-deflection apparatus disposed between the riser body and the face plate for reducing deflection of the face plate when a workpiece is clamped in the chuck, the anti-deflection apparatus being attached to the chuck with at least one threaded fastener.

2. The chuck of claim 1, wherein the anti-deflection apparatus further comprises a tool body having a first face substantially orthogonal to a second face.

3. The chuck of claim 2, wherein the anti-deflection apparatus further comprises a projection extending from the first face and at least partially disposed within an aperture in the riser body.

4. The chuck of claim 1, wherein the anti-deflection apparatus further comprises an aperture therethrough for allowing access to certain chuck components.

5. The chuck of claim 1, further comprising a first adjustment device for adjusting the location of the apparatus relative to the riser body.

6. The chuck of claim 1, further comprising a second adjustment device for facilitating adjustment of the face plate.

7. The chuck of claim 1, further comprising a plurality of similarly configured anti-deflection apparatuses.

8. A chuck body for a wheel to be worked, comprising:
   a shell portion;
   a plate portion;
   cantilevered rest portions attached to the plate portion and extending radially outboard at spaced points around the shell portion for receiving the wheel to be worked;
   a cam arm at each of the spaced points movable with respect to the shell portion to clamp the wheel to each of the cantilevered rest portions at their respective spaced points; and
   a tool body affixed to the shell portion and adjustably extending radially outboard alongside a respective cam arm at each of the spaced points to resist distortion of the plate portion when the wheel is clamped to the rest portions.

9. A chuck, comprising:
   a riser body;
   a face plate attached to the riser body;
   an anti-deflection apparatus disposed between the riser body and the face plate for reducing deflection of the face plate when a workpiece is clamped in the chuck; and
   a first adjustment device for adjusting the location of the apparatus relative to the riser body.

10. The chuck of claim 9, wherein the anti-deflection apparatus further comprises a tool body having a first face substantially orthogonal to a second face.

11. The chuck of claim 10, wherein the anti-deflection apparatus further comprises a projection extending from the first face and at least partially disposed within an aperture in the riser body.

12. The chuck of claim 9, wherein the anti-deflection device is attached to the chuck with at least one threaded fastener.

13. The chuck of claim 9, wherein the anti-deflection apparatus further comprises an aperture therethrough for allowing access to certain chuck components.

14. The chuck of claim 9, further comprising a second adjustment device for facilitating adjustment of the face plate.

15. The chuck of claim 9, further comprising a plurality of similarly configured anti-deflection apparatuses.

16. A chuck, comprising:
   a riser body;
   a face plate attached to the riser body;
   an adjustment device for facilitating adjustment of the face plate; and
   an anti-deflection apparatus disposed between the riser body and the face plate for reducing deflection of the face plate when a workpiece is clamped in the chuck.

17. The chuck of claim 16, wherein the anti-deflection apparatus further comprises a tool body having a first face substantially orthogonal to a second face.

18. The chuck of claim 17, wherein the anti-deflection apparatus further comprises a projection extending from the first face and at least partially disposed within an aperture in the riser body.

19. The chuck of claim 16, wherein the anti-deflection device is attached to the chuck with at least one threaded fastener.

20. The chuck of claim 16, wherein the anti-deflection apparatus further comprises an aperture therethrough for allowing access to certain chuck components.

21. The chuck of claim 16, further comprising an apparatus adjustment device for adjusting the location of the apparatus relative to the riser body.

22. The chuck of claim 16, further comprising a plurality of similarly configured anti-deflection apparatuses.

* * * * *